UNITED STATES PATENT OFFICE.

LEWIS CHEESEMAN, OF HATFIELD, MASSACHUSETTS.

GERMICIDE AND INSECTICIDE.

1,343,034.  Specification of Letters Patent.  Patented June 8, 1920.

No Drawing.  Application filed March 6, 1919. Serial No. 280,929.

*To all whom it may concern:*

Be it known that I, LEWIS CHEESEMAN, citizen of the United States, residing at Hatfield, in the county of Hampshire and State of Massachusetts, have invented certain new and useful Improvements in Germicides and Insecticides; and I do hereby declare the following to be a full, clear, and exact description of the invention, such as will enable others skilled in the art to which it appertains to make and use the same.

This invention relates to a new and useful germicide and insecticide for destroying certain injurious life incident to growing plants, vines and trees.

One of the objects of the invention is to provide a germicide and insecticide which will destroy harmful bacteria which cause rust, blight, damping off, scab, etc.

Another object of the invention is to provide an improved insecticide which will destroy maggots, worms, cut worms, ants, San José and similar scale insects, aphides and delicate larvæ, larvæ of common house fly, etc.

My invention consists in a germicide or insecticide using the alkaline earth base, barium, preferably as hydrate, or as hydrate and sulf-hydrate.

I prefer to use a mixture of powdered barium sulfid and powdered hydrate of lime. When this mixture is moistened in any manner, either by moist air, dew, or soil moisture, the water is decomposed giving the hydrate and sulf-hydrate of barium and a further reaction tends to take place giving sulf-hydrate of lime and hydrate of barium, by a reaction between the sulf-hydrate of barium and hydrate of lime.

I may also use the hydrates of calcium and barium together with the sulf-hydrates of calcium and barium, by bringing the dry mixture of the sulfid of barium and calcium hydrate in contact with moisture, which produces water soluble salts as outlined above.

When I employ hydrate and sulf-hydrate, I form the double molecule from barium sulfid, with moisture according to the reaction:

$$2BaS + 2H_2O = Ba(OH)_2 + Ba(SH)_2$$

When using barium sulfid I prefer to add sufficient oxid of lime or oxid of lime and water (as hydrate) to gradually convert the barium sulf-hydrate formed by the moisture, into barium hydrate according to the reaction:

$$Ba(SH)_2 + 2Ca(OH)_2 = Ba(OH)_2 + 2CaS + 2H_2O$$

I find that when barium hydrate or barium hydrate and sulf-hydrate mixed with hydrate of lime, or its equivalent, oxid of lime, are placed upon the trees, plants, vines, etc., all acid bodies tend to combine with the barium base, which base is probably the most powerful alkaline earth base known, forming in many cases, salts insoluble in water.

When barium hydrate or barium hydrate and barium sulf-hydrate mixed with oxid of lime, or oxid of lime with sufficient water to form hydrate of lime, are added to finely ground phosphate of lime, the mixture will effectively destroy insect life, in addition to aiding the vegetable life.

In making up my improved germicide and insecticide of barium sulfid and calcium hydrate, I find it advantageous to use substantially the proportions of two pounds of barium sulfid with one pound of calcium hydrate, while in a mixture of barium sulfid and calcium oxid, the proportions are substantially three pounds of barium sulfid and one pound of calcium oxid. The proportionate mixtures have given the most advantageous effect of barium hydrate as a germicide and insecticide.

The mixtures may be used in powdered form, in which case they will combine with the moisture in the soil, air or dew on the vegetable life, to form the barium hydrate. If desired, however, the mixture may be combined with water and used as a spray.

I have found that the combinations of chemicals I employ are superior to the germicides and insecticides known as arsenicals and various emulsions made with kerosene oil, soap, milk, etc., as my germicide and insecticide will not destroy the leaves or plants, and, as a matter of fact, my mixture will stimulate the growth of the vegetable life.

In order to make the germicide and insecticide more active, finely powdered burnt lime may be added to the powdered sulfid of barium. This activity is due to the fact that the lime oxid combines with water and is at its maximum solubility when freshly made.

What I claim and desire to secure by Letters Patent is:—

1. A germicide and insecticide including the alkaline earth base barium as hydrate and sulf-hydrate, and another alkaline earth base mixed therewith.

2. A germicide and insecticide including among its component parts, barium sulfid and oxid of lime.

In testimony whereof I affix my signature.

LEWIS CHEESEMAN.